United States Patent Office 3,595,963
Patented July 27, 1971

3,595,963
METHOD OF CONTROLLING THE GROWTH OF FUNGI
Pasquale P. Minieri, Woodside, N.Y., assignor to Tenneco Chemicals, Inc.
No Drawing. Continuation-in-part of application Ser. No. 620,293, Mar. 3, 1967. This application Apr. 3, 1969, Ser. No. 813,342
Int. Cl. A01n 9/00
U.S. Cl. 424—288
6 Claims

ABSTRACT OF THE DISCLOSURE

Organotin compounds, which have the structure

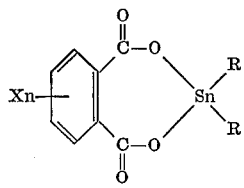

wherein each R represents phenyl or an alkyl group having from 4 to 8 carbon atoms; X represents alkyl groups having from 1 to 4 carbon atoms, halogen, phenyl, carboxy, or nitro; and n represents an integer in the range of 1 to 4, effectively control the growth of fungi, and particularly plant pathogens, without causing appreciable injury to the host plant. Among the most effective of these fungicides is dibutyl tin 3,4-dimethyl-6-isobutylphthalate.

---

This is a continuation-in-part of my copending application Ser. No. 620,293, which was filed on Mar. 3, 1967, now U.S. Pat. No. 3,454,611.

This invention relates to a method of controlling the growth of fungi. More particularly, it relates to a method of controlling the growth of fungi on living plant materials that are intended for human or animal consumption.

In accordance with this invention, it has been found that certain substituted organotin phthalates are highly effective against a wide variety of plant pathogens, including those responsible for early blight and late blight of tomatoes, powdery mildew of beans, and other serious crop diseases. Because they provide long lasting protection, fewer applications of these fungicides are required to control plant diseases than are necessary when manganese ethylene bis dithiocarbamate and other previously known agricultural fungicides are used.

The organotin phthalates that can be used in the practice of this invention may be represented by the structural formula

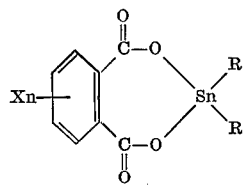

wherein each R represents phenyl or an alkyl group having from 4 to 8 carbon atoms; X represents an alkyl group having from 1 to 4 carbon atoms, halogen phenyl, carboxyl, or nitro; and n represents an integer in the range of 1 to 4. Illustrative of these compounds are the following: di-n-butyl tin 3,4,5-trimethylphthalate, di-n-hexyl tin 3,5,6-trimethylphthalate, di-2-ethyl-hexyl tin 3,4-dimethyl-6-isobutylphthalate, ditert. butyl tin 3,4,5,6-tetrachlorophthalate, di-2-ethylbutyl tin 4-carboxyphthalate, di-n-octyl tin 3,4,5,6-tetraphenylphthalate, diphenyl tin 3-nitrophthalate, and the like. A single dialkyl (or diaryl) tin phthalate or a mixture of two or more of these compounds may be used.

The fungicidal compounds may be prepared, for example, by the reaction of the appropriate substituted phthalic anhydride with a dialkyl or diaryl tin oxide or by the reaction of a phthalic acid with a dialkyl or diaryl tin dichloride. Suitable substituted phthalic anhydrides may be prepared by aromatizing the products of the condensation of maleic anhydride with dienes, such as 1,3-hexadiene, 2,4-hexadiene, 3-methyl-2,4-hexadiene, 2,4 - dimethyl - 1,3 - pentadiene, dimethylbutadienes, isoprene, 1,1,3 - trimethylbutadiene, 1,1,4 - trimethylbutadiene, 1 - phenyl - 4 - methylbutadiene, allo - ocimene, 5-methyl - 4 - isopropyl - 1,3 - hexadiene, and the like, by treatment first with palladium and then with an alkaline or acidic aqueous solution.

While the fungicidal compounds may be applied as such to the soil, they are ordinarily and preferably combined with an inert fungicidal adjuvant carrier and applied as a solution, emulsion, suspension, or dust. Aqueous emulsions or suspensions that contain about 0.001 percent to 1 percent by weight, and preferably 0.01 percent to 0.5 percent by weight, of the active agent are particularly suitable for this use. These compositions may also contain about 0.01 percent to 0.1 percent by weight of a wetting agent, such as an alkyl sulfate, an alkyl aryl sulfonate, a sulfosuccinate, a polyethylene glycol ether, and the like. Alternatively, the fungicidal compounds may be dissolved in an organic solvent, such as acetone, naphtha, ethylene chloride, or kerosene, and applied as solutions, or they may be mixed with or deposited upon such finely-divided solid carriers as clay, chalk, bentonite, talc, kaolin, fuller's earth, and the like and applied as dusts.

The fungicidal compounds may be applied by known techniques to plants, to plant seeds, or to the soil in which plants are growing or are to be grown. They may be applied to the parts of the plants above or in the soil, or the plant seeds may be contacted with the fungicidal compound. Alternatively, the fungicide may be introduced into the soil near the roots of the plants or applied to the surface of the soil and then mixed into the soil to the desired depth.

The amount of the fungicidal composition that is applied is dependent upon such factors as the species of plant being treated and the plant pathogen whose control is desired and is that amount which will inhibit or prevent the growth of the plant pathogen while causing little or no injury to the plants. About 1 pound to 200 pounds of the active compound is ordinarily applied per acre with particularly good results being obtained when 5 pounds to 35 pounds per acre is used.

The substituted tin phthalates may be used as the sole active component of the fungicidal compositions. If desired, however, these compositions may also contain other fungicides, such as sulfur and the metal dimethyldithiocarbamates; insecticides, such as DDT and benzene hexachloride; or plant nutrients, such as urea, ammonium nitrate, and potash.

The invention is further illustrated by the examples that follow.

EXAMPLE 1

(A) To 476 grams (3.5 moles) of freshly-distilled alloocimene was added a solution of 245 grams (2.5 moles) of maleic anhydride in 720 grams (8.17 moles) of ethyl acetate at such a rate that the temperature rose to 88°–90° C. and remained at that temperature throughout the addition. The reaction mixture was heated with stirring at 88°–90° C. for 5 hours and then heated under vacuum to remove the ethyl acetate. The residue was distilled under reduced pressure to remove unreacted alloocimene from the product. There was obtained about 450 grams of 3,4-dimethyl-6-isobutenyltetrahydrophthalic anhydride.

(B) A mixture of 330 grams (1.42 moles) of 3,4-dimethyl-6-isobutenyltetrahydrophthalic anhydride and 20 grams of 5% palladium on carbon was stirred for 6 hours at 260°–280° C. and then cooled to room temperature. After it had been allowed to stand overnight, the reaction mixture was treated with 820 ml. of a 15% aqueous sodium hydroxide solution, heated at 90°–100° C. for 1 hour, diluted with 1700 ml. of water, and filtered. The filtrate was acidified to pH 5 with hydrochloric acid. The crude product that precipitated was collected and recrystallized from ethanol. There was obtained 102.6 grams of 3,4-dimethyl-6-isobutylphthalic anhydride, which melted at 89°–90° C.

(C) A mixture of 195 grams (0.782 mole) of di-n-butyl tin oxide, 182 grams (0.782 mole) of 3,4-dimethyl-6-isobutylphthalic anhydride, and 1170 ml. of toluene was heated at its reflux temperature for 3 hours and then cooled to room temperature. The reaction mixture was heated to 60° C. under vacuum to remove the toluene. There was obtained 377 grams of di-n-butyl tin 3,4-dimethyl-6-isobutylphthalate, which contained 24.8 percent Sn (calculated, 24.7 percent Sn).

EXAMPLE 2

(A) A solution of 0.3 mole of 3,4-dimethylphthalic anhydride and 0.6 mole of potassium hydroxide in 300 ml. of water was heated on a water bath to distill off the water. There was obtained 0.3 mole of the dipotassium salt of 3,4-dimethylphthalic anhydride.

(B) A mixture of 0.1 mole of the dipotassium salt, 0.1 mole of diphenyl tin dichloride, and 400 ml. of ethanol was heated at its reflux temperature for 5 hours, cooled to room temperature, and stirred at room temperature overnight. The reaction mixture was filtered, and the solid product was dried at 125° C. There was obtained a high yield of diphenyl tin 3,4-dimethylphthalate.

EXAMPLE 3

A mixture of 18.1 grams (0.05 mole) of di-n-octyl tin oxide, 11.6 grams (0.05 mole) of 3,4-dimethyl-6-isobutylphthalic anhydride, and 150 ml. of toluene was heated at its reflux temperature for 3 hours and then cooled to room temperature. The reaction mixture was heated to 80° C. under vacuum to remove the toluene. There was obtained 28.9 grams of di-n-octyl tin 3,4-dimethyl-6-isobutylphthalate, which contained 20.97 percent Sn (calculated for $C_{30}H_{50}O_4Sn$, 20.05 percent Sn).

EXAMPLE 4

A mixture of 12.5 grams (0.05 mole) of dibutyl tin oxide and 150 ml. of toluene was heated to its reflux temperature to remove traces of water azeotropically and then cooled to room temperature. Tetraphenylphthalic anhydride (22.6 grams; 0.05 mole) was added, and the reaction mixture was heated at its reflux temperature for two hours. Upon removal of the toluene by distillation under vacuum, there was obtained 35.2 grams of di-n-butyl tin tetraphenylphthalate, which melted at 223°–225° C. and which contained 16.64 percent Sn (calculated for $C_{40}H_{38}O_4Sn$, 16.95 percent Sn).

EXAMPLE 5

Using the procedure described in Example 4, 3-nitrophthalic anhydride was reacted with di-n-butyl tin oxide to form di-n-butyl tin 3-nitrophthalate in a substantially quantitative yield. The product melted at 145°–147° C. and contained 27.4 percent Sn and 3.20 percent N (calculated for $C_{16}H_{21}NO_6Sn$, 26.9 percent Sn and 3.17 percent N).

EXAMPLE 6

Using the procedure described in Example 4, trimellitic anhydride was reacted with di-n-butyl tin oxide to give an 88.9 percent yield of di-n-butyl tin 4-carboxyphthalate, which melted at 237°–240° C. and which contained 28.8 percent Sn (calculated for $C_{17}H_{22}O_6Sn$, 28.7 percent Sn).

EXAMPLE 7

Using the procedure described in Example 4, tetrachlorophthalic anhydride was reacted with di-n-butyl tin oxide in toluene to form di-n-butyl tin 3,4,5,6-tetrachlorophthalate in a substantially quantitative yield. The product Sn and 18.7 percent Cl (calculated for $C_{16}H_{18}Cl_4O_4Sn$, 22.2 percent Sn and 26.6 percent Cl).

EXAMPLE 8

(A) Acetone solutions were prepared by dissolving 100 mg. portions of the products of Examples 1–7 in 10 ml. of acetone that contained 2000 p.p.m. of sorbitan trioleate (Span 85) and 5000 p.p.m. of a polyoxyethylene ether of sorbitan monooleate (Tween 80). The acetone solutions were dispersed in 90 ml. portions of distilled water to form aqueous solutions that contained 1000 p.p.m. of the fungicidal compound. More dilute solutions were prepared by adding distilled water to these solutions.

(B) Fifty percent water-soluble fungicidal powders were prepared by blending 2 grams of the products of this invention with 1.88 grams of attapulgite clay, 0.06 gram of sodium alkyl naphthalenesulfonate (Nekal BX–78), and 0.06 gram of sodium lignosulfonate.

EXAMPLE 9

Series of experiments were carried out in which tomato plants which had been sprayed with dilute aqueous solutions of di-n-butyl tin 3,4-dimethyl-6-isobutylphthalate or the commercial fungicide Maneb (manganous ethylene bis dithiocarbamate) prepared by the procedure of Example 8A were sprayed with suspensions of spores of the fungi that cause early and late blight of tomatoes. One week after treatment, the degree of suppression of the disease was noted. From the results given in Table I it will be seen that di-n-butyl tin 3,4-dimethyl-6-isobutylphthalate was more effective than Maneb in controlling both early blight and late blight of tomatoes.

TABLE I

| Fungicide | Concentration of fungicide in aqueous solution | Percent control of early blight of tomatoes | Percent control of late blight of tomatoes |
|---|---|---|---|
| Di-n-butyl tin 3,4-dimethyl-6-isobutylphthalate | 500 | 100 | 100 |
| | 100 | 99 | 100 |
| | 20 | 88 | 100 |
| | 4 | 73 | 90 |
| | 1 | 60 | 92 |
| Maneb | 500 | 100 | 100 |
| | 100 | 100 | 100 |
| | 20 | 83 | 74 |
| | 4 | 65 | 67 |
| | 1 | 33 | 79 |

EXAMPLE 10

Separate lots of sterile soil that had been inoculated with a plant pathogen were planted with seeds of a crop plant. The planted soil was then treated with a dilute aqueous solution of di-n-butyl tin 3,4-dimethyl-6-isobutylphthalate or Maneb prepared by the procedure of Example 8A. Two weeks after treatment the results were noted. The results of these tests are given in Table II.

TABLE II

| Plant pathogen | Plant | Fungicide | Rate of application (p.p.m.) | Percent control of pathogen |
|---|---|---|---|---|
| Colletotrichum lagenarium | Cucumber | Di-n-butyl tin 3,4-dimethyl-6-isobutylphthalate | 500 | 97 |
| | | | 100 | 92 |
| | | | 20 | 90 |
| | | | 4 | 60 |
| | | Maneb | 500 | 100 |
| | | | 100 | 100 |
| | | | 20 | 98 |
| | | | 4 | 80 |
| Cercospora beticola | Sugar beet | Di-n-butyl tin 3,4-dimethyl-6-isobutylphthalate | 500 | 99 |
| | | | 100 | 99 |
| | | | 20 | 99 |
| | | | 4 | 84 |
| | | | 0.8 | 81 |
| | | Di-n-butyl tin 3,4-dimethyl-6-isobutylphthalate [1] | 500 | 100 |
| | | | 100 | 100 |
| | | | 20 | 89 |
| | | | 4 | 87 |
| | | | 0.8 | 37 |
| | | Maneb | 500 | 100 |
| | | | 100 | 100 |
| | | | 20 | 90 |
| | | | 4 | 61 |
| | | | 0.8 | 0 |

[1] After 2″ of artificial rainfall.

EXAMPLE 11

A series of experiments was carried out in which tomato plants that had been treated with the aqueous solutions of the fungicidal powders of Example 8B were sprayed with a suspension of spores of *Alternaria solani*, the fungus that causes early blight of tomatoes. One week after treatment, the degree of suppression of the disease was noted. The results obtained are summarized in Table III.

TABLE III

| Fungicide | Rate of application (p.p.m.) | Percent control of early blight of tomato |
|---|---|---|
| Product of Ex.: | | |
| 1 | 1,000 | 100 |
| | 100 | 100 |
| | 20 | 90 |
| 4 | 1,000 | 23 |
| 5 | 1,000 | 73 |
| 6 | 1,000 | 78 |
| 7 | 1,000 | 99 |
| | 100 | 86 |
| | 20 | 65 |

EXAMPLE 12

Tendergreen bean plants with fully expanded primary leaves were inoculated with spores of *Erysiphe polygoni*, the powdery mildew fungus. Forty-eight hours later, the plants were sprayed with aqueous solutions prepared by the process of Example 8A. After a period of 7–10 days, the degree of suppression of the disease was noted. The results obtained are summarized in Table IV.

TABLE IV

| Fungicide | Concentration of fungicide in aqueous solution (p.p.m.) | Control of powdery mildew of beans |
|---|---|---|
| Product of Ex.: | | |
| 1 | 1,000 | Fair control. |
| | 1,000 | Good control. |
| 4 | 500 | Do. |
| | 100 | Do. |
| | 20 | No control. |
| 5 | 1,000 | Good control. |
| | 500 | Complete control. |
| | 100 | Good control. |
| | 20 | Slight control. |
| 7 | 1,000 | Good control. |
| | 200 | Slight control. |

The terms and expressions that have been used are used as terms of description and not of limitation. There is no intention in the use of such terms and expressions of excluding any equivalents of the features shown and described or portions thereof. It is recognized that various modifications are possible within the scope of the invention claimed.

What is claimed is:

1. The method of protecting living plants from attack by fungi which comprises applying to the plants a fungicidal amount of an organotin compound having the structural formula

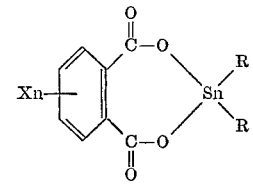

wherein each R represents a member selected from the group consisting of phenyl and alkyl groups having from 4 to 8 carbon atoms; X represents a member selected from the group consisting of alkyl groups having from 1 to 4 carbon atoms, halogen, phenyl, carboxy, and nitro; and $n$ represents an integer in the range of 1 to 4.

2. The method of claim 1 wherein the organotin compound is di-n-butyl tin 3,4-dimethyl-6-isobutylphathalate.

3. The method of claim 1 wherein the organotin compound is di-n-butyl tin 3,4,5,6-tetrachlorophthalate.

4. The method of claim 1 wherein the organotin compound is di-n-butyl tin 3,4,5,6-tetraphenylphthalate.

5. The method of claim 1 wherein the organotin compound is di-n-butyl tin 4-carboxyphthalate.

6. The method of claim 1 wherein the organotin compound is di-n-butyl tin 3-nitrophthalate.

References Cited

UNITED STATES PATENTS 3,214,453   10/1965   Stern _____ 260—429.7

ALBERT T. MEYERS, Primary Examiner

F. E. WADDELL, Assistant Examiner